S. E. DOANE.
ARTIFICIAL BAIT.
APPLICATION FILED JULY 30, 1920.
1,362,562.
Patented Dec. 14, 1920.
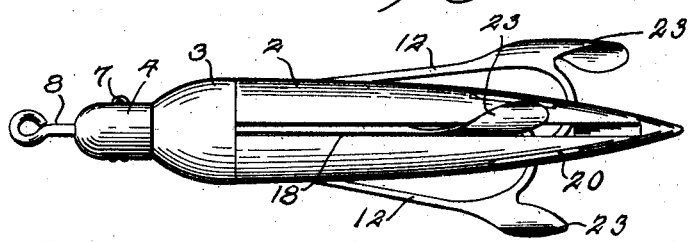
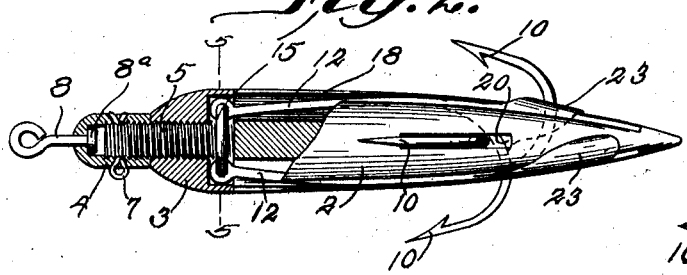
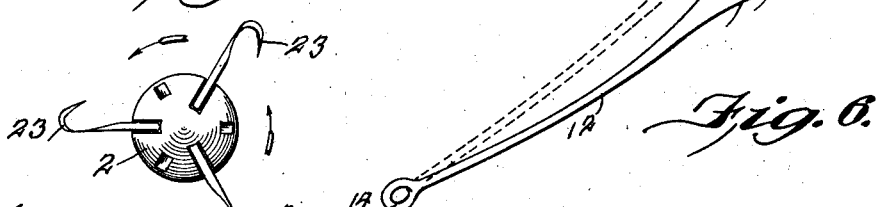
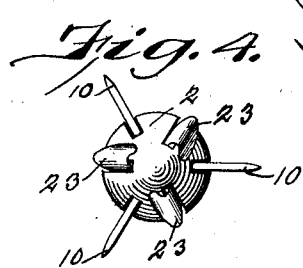
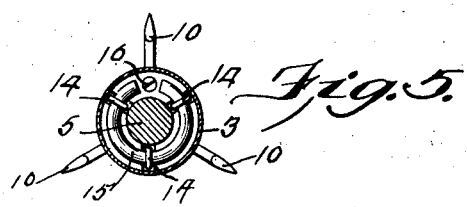
Inventor
Samuel E. Doane
By
Eugene E. Brown
Attorney
Witness

UNITED STATES PATENT OFFICE.

SAMUEL E. DOANE, OF NEW YORK, N. Y.

ARTIFICIAL BAIT.

1,362,562.   Specification of Letters Patent.   Patented Dec. 14, 1920.

Application filed July 30, 1920. Serial No. 400,053.

*To all whom it may concern:*

Be it known that I, SAMUEL E. DOANE, a citizen of the United States, residing at New York, in the county of New York and State of New York, have invented certain new and useful Improvements in Artificial Bait, of which the following is a specification.

This invention relates to artificial bait such as used in trolling or spinning and my main object is to provide a bait which may be employed in weedy waters without be employed in weedy waters without danger of becoming entangled.

I attain this object by shaping the stems of the hooks so that the action of the water as the bait is pulled along will cause the hooks to be retracted into recesses within the body of the bait, but will be projected as soon as the bait is grabbed by a fish.

In the following description I shall refer to the accompanying drawings, in which—

Figure 1 is a side elevation of an artificial bait embodying my invention and showing the hooks retracted within the bait; Fig. 2 is a similar view but with the hooks thrown out into operative position, the body of the bait being partly broken away to disclose the interior structure; Figs. 3 and 4 are end views taken respectively with the hooks retracted and with them projected into grabbing position; Fig. 5 is a transverse sectional view on the line 5—5 of Fig. 2; and Fig. 6 is a detail view of one of the swinging arms which carry the hooks.

The bait is substantially cigar-shape comprising a main tapering body portion 2, cap 3 and swivel lock nut 4. The cap and nut are threaded upon a stem 5 which projects from the inner end of the body portion, the nut being locked and held from rotation by a cotter pin 7 passing through registering apertures in the stem and nut. The leader pin 8 to which the line is secured, passes through a hole in the end of the lock nut and is provided with an enlarged head 8ª upon which the nut is swiveled so that the bait may revolve or spin upon the pin.

The hooks 10 are formed integral with the arms 12 which are provided at their inner ends with eyes 14 by which they are pivotally secured to a split ring 15, which is threaded through the eyes of the several arms and is then slipped over the stem 5 and bears against the end of the main body. The ring is held against rotary or axial movement by a screw pin 16, inserted between its ends. The body portion is provided with longitudinal grooves 18 to receive the arms or stems 12 and which merge adjacent the outer end into slots 20 extending through the body to permit the passage of the hooks and the outer curved ends of the arms 12.

For the purpose of causing the hooks to be normally held in retracted position within the body of the bait, I provide the arms 12 with integral vanes 23, which branch from the arms at the beginning of the curved hook ends. The vanes or blades 23 are curved or rolled transversely as indicated, to provide an overhanging curved lip, so shaped that the action of the water as the bait is pulled along tends to swing the vanes outwardly upon their pivot eyes 14 into the position shown in Fig. 1, thereby withdrawing the hooks and concealing them within the body of the bait. In this position, the bait may be drawn through waters thick with weeds without danger of becoming entangled. When the bait is seized by a fish, the vanes 23 are forced inwardly, thus causing the hooks to be moved outwardly into grappling position illustrated in Fig. 2, from which the fish cannot escape. The vanes may be shaped to cause a rotary motion of the bait upon the swivel pin 8, as indicated by the arrows in Fig. 3, although this is not essential, the important feature being the outward movement of the vanes causing the retraction of the hooks.

I have described in detail the particular construction illustrated in the accompanying drawings for the purpose of disclosing an embodiment of my invention, but it will be evident to engineers and skilled mechanics that various changes and modifications can be made without departing from the invention.

I claim:—

1. An artificial bait, comprising an elongated body tapering rearwardly and provided with a plurality of longitudinally extending slots, an attaching connection at the forward end, and pivotally mounted hooks adapted to oscillate within said slots and provided with integral vanes or blades which cause the hooks to be retracted within the slots when drawn through the water.

2. An artificial bait, comprising an elongated body tapering rearwardly and having a plurality of slots extending therethrough, a plurality of hooks having their stems pivotally secured at their inner ends, their pronged ends being movable through said slots, said stems having vanes or blades projecting from their outer ends which cause the bait to revolve when drawn through the water, and said stems to swing outwardly on their pivots until the pronged ends are concealed within said slots.

3. An artificial bait, comprising an elongated body tapering rearwardly and provided with a plurality of symmetrically disposed slots or recesses, a leader pin swiveled to its forward end, and a plurality of hooks pivotally mounted within said slots and having integral vanes or blades which cause the bait to revolve or spin when drawn through the water, thereby throwing the stems of the hooks outwardly until the pronged ends are housed within said slots.

4. An artificial bait, comprising an elongated body tapering rearwardly and provided with a plurality of symmetrically disposed slots or recesses, a swiveled attaching device at its forward end, and a plurality of hooks having their stems pivotally secured at their inner ends within said slots, and vanes or blades at their outer ends separated from the prongs or pointed ends of the hooks.

5. An artificial bait, comprising a body provided with a slot or recess and a hook having its stem pivotally secured at its inner end and a vane or blade at its outer end extending oppositely to its prong or pointed end.

In testimony whereof I affix my signature.

SAMUEL E. DOANE.